US011156557B2

(12) United States Patent
Yanata et al.

(10) Patent No.: US 11,156,557 B2
(45) Date of Patent: Oct. 26, 2021

(54) CHEMILUMINESCENCE ANALYZER, BLOOD PURIFICATION APPARATUS, AND BLOOD PURIFICATION SYSTEM

(71) Applicants: Toshio Yanata, Kanagawa (JP);
Masafumi Hashiguchi, Kanagawa (JP);
Yasuhide Fukushima, Tokyo (JP);
Yutaro Hoshino, Kanagawa (JP);
Mikihiko Takao, Kanagawa (JP)

(72) Inventors: Toshio Yanata, Kanagawa (JP);
Masafumi Hashiguchi, Kanagawa (JP);
Yasuhide Fukushima, Tokyo (JP);
Yutaro Hoshino, Kanagawa (JP);
Mikihiko Takao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 709 days.

(21) Appl. No.: 15/923,526

(22) Filed: Mar. 16, 2018

(65) Prior Publication Data
US 2018/0266963 A1    Sep. 20, 2018

(30) Foreign Application Priority Data

Mar. 17, 2017   (JP) .............................. JP2017-053495
Dec. 26, 2017   (JP) .............................. JP2017-249296

(51) Int. Cl.
*G01N 1/00* (2006.01)
*G01N 21/76* (2006.01)
*B01L 3/00* (2006.01)

(52) U.S. Cl.
CPC .............. *G01N 21/76* (2013.01); *B01L 3/502* (2013.01); *B01L 3/563* (2013.01); *B01L 2300/0627* (2013.01); *B01L 2400/06* (2013.01)

(58) Field of Classification Search
None
See application file for complete search history.

(56) References Cited

U.S. PATENT DOCUMENTS 6,716,391 B1   4/2004  Olson
8,182,746 B2 *  5/2012  Guzman .............. G01N 33/561
                                                422/82.01

(Continued)

FOREIGN PATENT DOCUMENTS

CN   103945877 A    7/2014
CN   105092504 A   11/2015

(Continued)

OTHER PUBLICATIONS

European Search Report; Application No. 18161057.7-1020; dated Jun. 5, 2018.

(Continued)

*Primary Examiner* — Jyoti Nagpaul
(74) *Attorney, Agent, or Firm* — Duft & Bornsen, PC

(57) ABSTRACT

A chemiluminescence analyzer includes a reactor to cause waste liquid discharged from a blood purification apparatus to react with a reagent solution, a photodetector to measure an intensity of chemiluminescence arising in the reactor, a first liquid conveyor to convey the waste liquid from a waste liquid passage of the blood purification apparatus to the reactor, and a second liquid conveyor to convey the reagent solution to the reactor. The chemiluminescence analyzer further includes a liquid mixture passage extending from the reactor to convey a liquid mixture including the waste liquid and the reagent solution after reaction, a joint to couple the liquid mixture passage to the waste liquid passage of the blood purification apparatus, and an electric interface for connection with an external device.

14 Claims, 5 Drawing Sheets

(56) References Cited

U.S. PATENT DOCUMENTS

| | | | |
|---|---|---|---|
| 9,388,503 B2 * | 7/2016 | Pamidi | .................... C25D 9/02 |
| 2015/0323447 A1 | 11/2015 | Alic et al. | |

FOREIGN PATENT DOCUMENTS

| | | |
|---|---|---|
| EP | 3056232 A1 | 8/2016 |
| JP | S57103650 A | 6/1982 |
| JP | S61251771 A | 11/1986 |
| JP | 5-107254 | 4/1993 |
| JP | H11304711 A | 11/1999 |
| JP | 2008-014910 | 1/2008 |
| JP | 2008-233005 | 10/2008 |
| JP | 2009-069024 | 4/2009 |
| JP | 2011-120823 | 6/2011 |
| JP | 2012026807 A | 2/2012 |
| JP | 2016-047126 | 4/2016 |
| JP | 2016-148535 | 8/2016 |
| WO | 2009035008 A1 | 3/2009 |
| WO | WO2012/133394 A1 | 10/2012 |

OTHER PUBLICATIONS

Chinese Office Action; Application CN201810204161.0; dated Apr. 21, 2020.
Japanese Office Action; Application 2017-249296; dated Jul. 13, 2021.

\* cited by examiner

CHEMILUMINESCENCE ANALYZER, BLOOD PURIFICATION APPARATUS, AND BLOOD PURIFICATION SYSTEM

CROSS-REFERENCE TO RELATED APPLICATIONS

This patent application is based on and claims priority pursuant to 35 U.S.C. § 119(a) to Japanese Patent Application Nos. 2017-053495 filed on Mar. 17, 2017 and 2017-249296 filed on Dec. 26, 2017, in the Japan Patent Office, the entire disclosure of each of which is hereby incorporated by reference herein.

BACKGROUND

Technical Field

This disclosure relates to a chemiluminescence analyzer, a blood purification apparatus, and a blood purification system.

Description of the Related Art

There are chemiluminescence analyzers including a reactor to cause a reaction between waste liquid discharged from a blood purification apparatus and a reagent solution and a photodetector to measure an intensity of chemiluminescence arising in the reactor.

For example, a chemiluminescence analyzer (a urea concentration measuring apparatus) includes a reactor, a tubing pump (i.e., a first liquid conveyor) to convey waste liquid (sample solution) to the reactor, and a photodetector (a photomultiplier). The tubing pump and the photodetector are controlled by a computer such as a personal computer (PC).

The configuration enables real-time measurement of a urea concentration in the waste liquid discharged from a blood purification apparatus (an artificial dialyzer). Thus, the configuration can be preferably used as a chemiluminescence analyzer for a blood purification apparatus capable of detecting the end of purification (dialysis) time.

SUMMARY

According to an embodiment of this disclosure, a chemiluminescence analyzer includes a reactor to cause waste liquid discharged from a blood purification apparatus to react with a reagent solution, a photodetector to measure an intensity of chemiluminescence arising in the reactor, a first liquid conveyor to convey the waste liquid from a waste liquid passage of the blood purification apparatus to the reactor, and a second liquid conveyor to convey the reagent solution to the reactor. The chemiluminescence analyzer further includes a liquid mixture passage extending from the reactor to convey a liquid mixture including the waste liquid and the reagent solution after reaction, a joint to couple the liquid mixture passage to the waste liquid passage of the blood purification apparatus, and an electric interface for connection with an external device.

In another embodiment, a blood purification apparatus includes the above-chemiluminescence analyzer to measure a concentration of a target component in waste liquid discharged in purifying blood.

In yet another embodiment, a blood purification system includes a blood purification apparatus; and the above-described chemiluminescence analyzer, to measure a concentration of a target component in the waste liquid discharged from the blood purification apparatus.

In yet another embodiment, a chemiluminescence analyzer includes the reactor, the photodetector, the first liquid conveyor, the second liquid conveyor, the liquid mixture passage, and the joint described above. The chemiluminescence analyzer further includes a controller to control the photodetector, the first liquid conveyor, and the second liquid conveyor; and a communicator to communicate with an external device.

In yet another embodiment, a blood purification apparatus includes the above-chemiluminescence analyzer to measure a concentration of a target component in waste liquid discharged in purifying blood.

In yet another embodiment, a blood purification system includes a blood purification apparatus; and the above-described chemiluminescence analyzer, to measure a concentration of a target component in the waste liquid discharged from the blood purification apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
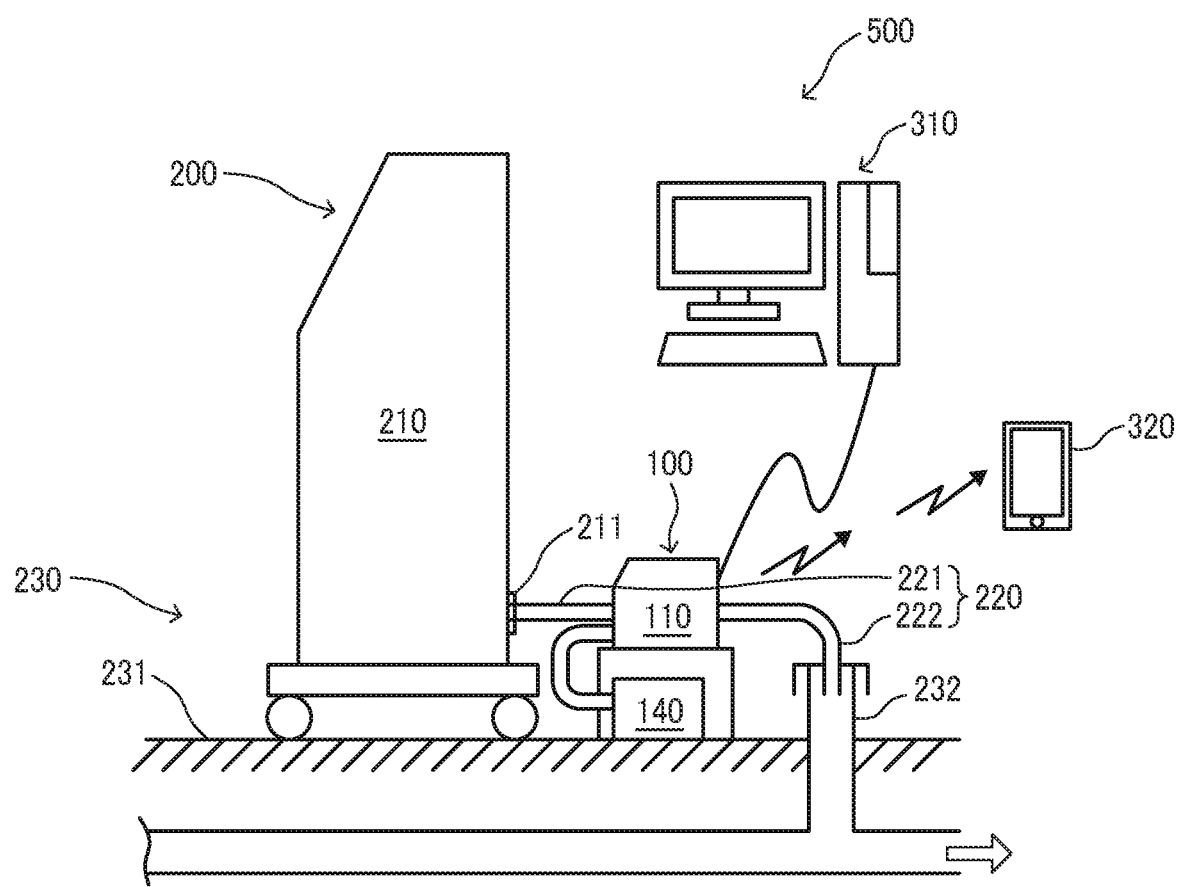
FIG. 1 is a schematic view of a blood purification system according to an embodiment of this disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus according to an embodiment of this disclosure is described. As used herein, the singular forms "a", "an", and "the" are intended to include the plural forms as well, unless the context clearly indicates otherwise.

Hereinafter, a blood purification system according to an embodiment of this disclosure (hereinafter, referred to as a blood purification system 500) is described. The blood purification system 500 includes a blood purification apparatus 200 and a chemiluminescence analyzer 100.

First, descriptions are given below of incorporation of a chemiluminescence analyzer in a blood purification apparatus.

As described above, chemiluminescence analyzers are typically built-in devices. Therefore, convenience in use, such as installing a chemiluminescence analyzer in the apparatus after shipment and using the chemiluminescence analyzer for standalone measurement, is limited.

Specifically, a power supply line, a signal line, a driver, and an amplifier are required for each of the devices included in the chemiluminescence analyzer to operate. Further, a controller (a computer or a sequencer) to control the power supply line, the signal line, the driver, and the amplifier is required.

Such a chemiluminescence analyzer requires a complicated or bulky control system. Thus, it is not easy to incorporate the chemiluminescence analyzer into a blood purification apparatus. In addition, procedure of independent measurement using the chemiluminescence analyzer is not simple.

Thus, a first object of the present embodiment is to provide an easily installable chemiluminescence analyzer.

Further, in a case of a chemiluminescence analyzer built in a blood purification apparatus, output results can vary depending on a manufacturer or an apparatus model. It is difficult to obtain measurement results using the same chemiluminescence analyzer, or differences in data format restrict convenience of use of data.

Thus, a second object is to provide a chemiluminescence analyzer to output unified measurement data regardless of the manufacturer of the blood purification apparatus or the apparatus model. This enables a doctor or a patient to make a more appropriate decision for, for example, improving living habits.

Further, the chemiluminescence analyzer 100 can facilitate transmission of data to an external terminal such as a computer or a server, a mobile terminal such as a smartphone, or a cloud to enable easy management of health and a dialysis result of each patient.

Furthermore, the chemiluminescence analyzer 100 can operate in conjunction with a blood purification apparatus to optimize dialysis conditions (speed and time) together with past dialysis results.

FIG. 1 is a schematic view of the blood purification system 500 according to the present embodiment.

As illustrated in FIG. 1, the blood purification system 500 includes the blood purification apparatus 200 such as a dialyzer and the chemiluminescence analyzer 100 to detect the concentration of urea in liquid. The chemiluminescence analyzer 100 is coupled to a waste liquid passage 220 to discharge waste liquid 201 from the blood purification apparatus 200.

The configuration illustrated in FIG. 1 is merely an example. Alternatively, the chemiluminescence analyzer 100 can be installed inside the blood purification apparatus 200 (i.e., a purification apparatus interior 210) as an optional device. Depending on the configuration of the chemiluminescence analyzer 100, the chemiluminescence analyzer 100 can also be used as a standalone device independent of the blood purification apparatus 200.

A known dialyzer can be used as the blood purification apparatus 200.

The waste liquid 201 discharged from the blood purification apparatus 200 passes through an interior of the chemiluminescence analyzer 100 (hereinafter "analyzer interior 110") and then is returned to the waste liquid passage 220 and discarded.

The waste liquid 201 discharged from the blood purification apparatus 200 is caused to react with a reagent 141 as a chemiluminescence reagent. The reagent 141 is supplied from a reagent container 140 installed outside the chemiluminescence analyzer 100.

The chemiluminescence analyzer 100 can operate as a standalone device. In addition, the chemiluminescence analyzer 100 can communicate with an external terminal 310 such as a computer or a server and a portable terminal 320 including a smartphone in a wired or wireless manner.

Next, a basic configuration of the chemiluminescence analyzer 100 will be described with reference to the drawings.

Figure 2:
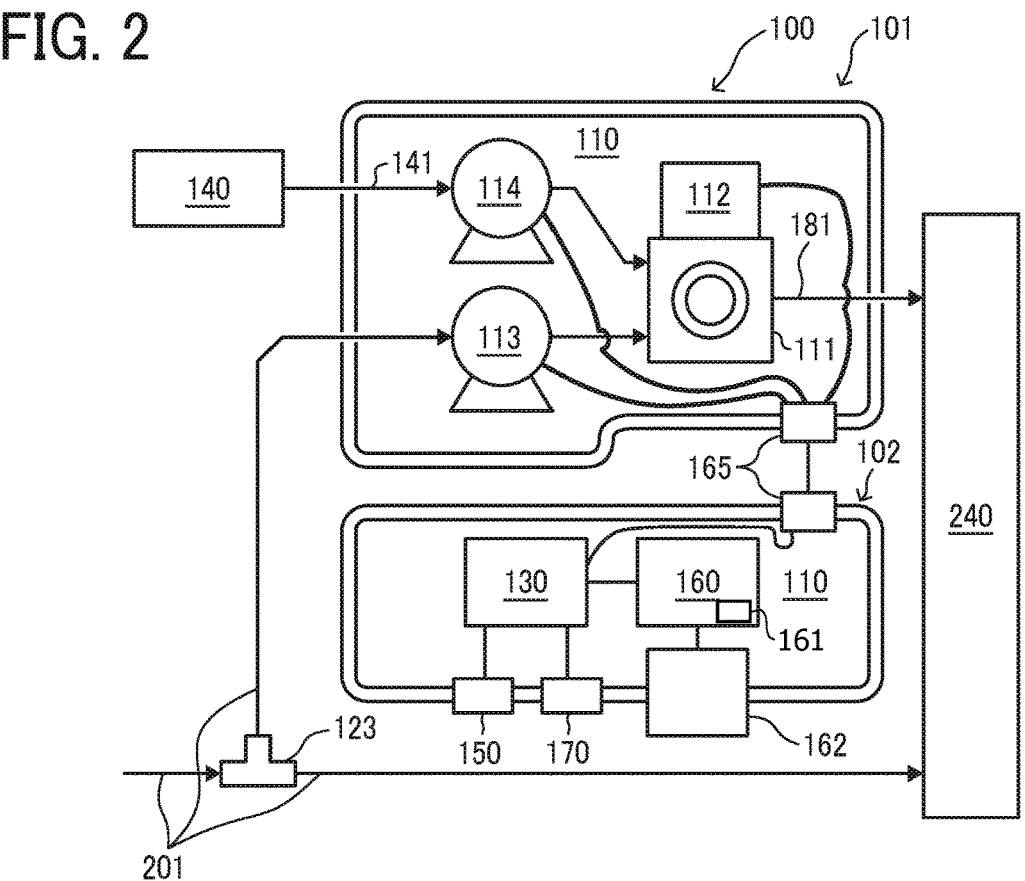
FIG. 2 is a schematic diagram illustrating a basic configuration of a chemiluminescence analyzer having two cases, of the blood purification system illustrated in FIG. 1.

FIG. 2 is an explanatory diagram illustrating the basic configuration of the chemiluminescence analyzer 100 having two cases.

As illustrated in FIG. 2, the chemiluminescence analyzer 100 includes a reactor 111 and a photodetector 112. The reactor 111 causes reaction between the waste liquid 201 containing urea, discharged from the blood purification apparatus 200, and the reagent 141. The photodetector 112 detects chemiluminescence arising from the chemical reaction between the waste liquid 201 and the reagent 141. The chemiluminescence analyzer 100 further includes a waste liquid conveyor 113 (e.g., a pump) to convey the waste liquid 201 from the blood purification apparatus 200 to the reactor 111 and a reagent conveyor 114 (e.g., a pump) to convey the reagent 141 to the reactor 111.

The chemiluminescence analyzer 100 further includes a controller 130 configured to control operations of each device and each unit (system) in the analyzer interior 110 and a communicator 160 for communication with the blood purification apparatus 200, the external terminal 310, the portable terminal 320, and a data recording medium (a memory) such as a magnetic card or an IC card.

The waste liquid 201 discharged from the blood purification apparatus 200 and the reagent 141 are conveyed to the reactor 111. Chemiluminescence occurs by the chemical reaction between the waste liquid 201 and the reagent 141.

Examples configurations of the reactor 111 include, but not limited to, those described in JP-4855854-B (JP-2008-014910-A) and JP-5637300-B (WO2012-133394-A1).

The photodetector 112 is disposed adjoining (in contact with) the reactor 111 and detects the amount of chemiluminescence arising in the reactor 111.

The photodetector 112 can be selected from examples including a photomultiplier, a photodiode, a phototransistor, a photo IC (integrated circuit), an avalanche photodiode, and a multi-pixel photon counter.

The waste liquid conveyor 113 is disposed between the waste liquid passage 220 for the waste liquid 201 discharged from the blood purification apparatus 200 and the reactor 111. The waste liquid conveyor 113 conveys the waste liquid 201 discharged from the blood purification apparatus 200 to the reactor 111.

The reagent conveyor 114 is disposed between the reagent container 140 and the reactor 111 or between a reagent port 127 and the reactor 111. The reagent conveyor 114 conveys the reagent 141 from the reagent container 140 to the reactor 111.

The chemiluminescence analyzer 100 further includes an electric interface 165 disposed between a conveyance and reaction unit 101 and the controller 130 inside a control and communication unit 102 for power supply and signal communication therebetween. The conveyance and reaction unit 101 contains electric parts and electronic parts such as the photodetector 112, the waste liquid conveyor 113, and the reagent conveyor 114.

As illustrated in FIG. 2, the case of the chemiluminescence analyzer 100 according to the present embodiment is divided into two cases of the control and communication unit 102 and the control and communication unit 102.

The controller 130 controls the operations of each device and each unit in the analyzer interior 110 and has functions to operate the waste liquid conveyor 113 so as to convey the waste liquid 201 from the blood purification apparatus 200 to the reactor 111; and operate the reagent conveyor 114 so as to convey the reagent 141 to the reactor 111.

Further, the controller 130 adjusts the waste liquid conveyor 113 using a measurement flow rate in some cases when a waste liquid flowmeter 117 is disposed between the waste liquid conveyor 113 and the reactor 111.

Further, the controller 130 multiplies a chemiluminescence amount detected by the photodetector 112 by a preliminarily recorded factor to obtain the urea concentration in the waste liquid 201 discharged from the blood purification apparatus 200.

Further, when the chemiluminescence analyzer 100 includes a liquid mixture flowmeter 119 to measure a flow rate of mixture (i.e., liquid mixture 181) of the waste liquid 201 and the reagent 141 after reaction in the reactor 111, the controller 130 is configured to use a measured flow rate to correct the chemiluminescence amount detected by the photodetector 112.

Further, when the chemiluminescence analyzer 100 includes a reagent thermometer 120 to measure the temperature of the reagent 141 and a tank liquid thermometer 115a to measure the temperature of the waste liquid 201, the controller 130 is configured to use a measured temperature to correct the detected chemiluminescence amount.

The controller 130 is configured to display various types of data such as, the obtained urea concentration, on a display 150 (see to FIG. 7) and transmits the data to the blood purification apparatus 200, the external terminal 310 such as a computer or a server, or the portable terminal 320 including a smartphone, through the communicator 160.

The controller 130 is configured to interpret and respond to an instruction from a user, made on a control panel 170 (refer to FIG. 7) and commands received, via the communicator 160, from the blood purification apparatus 200, the external terminal 310, and the portable terminal 320.

For example, the controller 130 starts or stops measurement, and performs processing such as display or report of error of measurement of the chemiluminescence analyzer 100.

As described above, the display 150 and the control panel 170 to accept user instruction enable the chemiluminescence analyzer 100 of the present embodiment to be operated and used independently.

The communicator 160 performs transmission and reception of data and instructions (commands) with the blood purification apparatus 200, the external terminal 310 such as a computer or a server, and the portable terminal 320 including a smartphone.

The communicator 160 can include communication software 161 or hardware only.

The communicator 160 can further perform reading and writing of data with respect to a data recording medium such as a magnetic card or an IC card.

The communicator 160 includes a transmission and reception device 162 (a communication device) such as a connector (interface), an antenna, and a slot for a data recording medium. Note that, alternatively, the transmission and reception device 162 can have the function of the electric interface 165 on the side of the control and communication unit 102.

The display 150 and the control panel 170 include a switch, a lamp, and a display device such as a display for an operator of the chemiluminescence analyzer 100 to designate the timing of start or end of measurement and to check a measurement result and the state of the chemiluminescence analyzer 100.

Next, an operation in practice will be described below.

Figure 4:
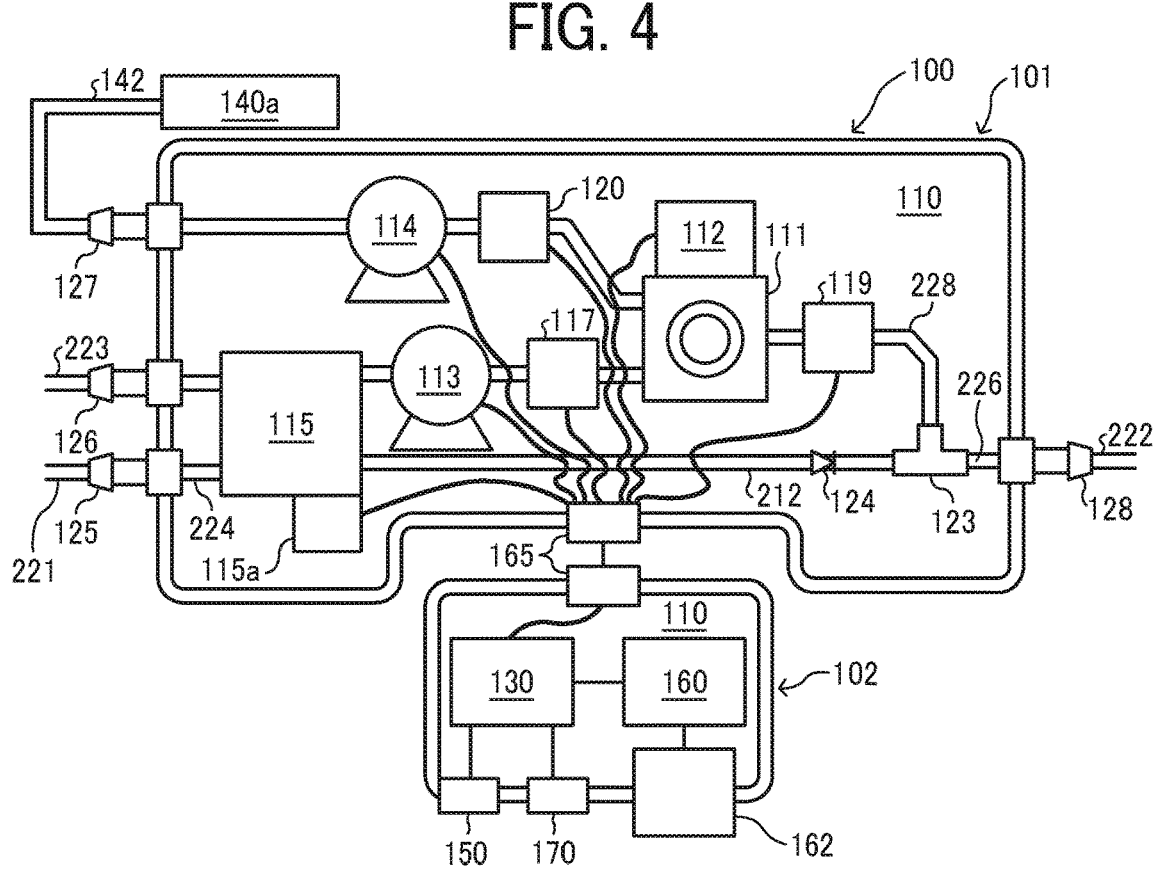
FIG. 4 is an explanatory diagram illustrating another structure of the chemiluminescence analyzer having two cases.

The chemiluminescence analyzer 100 includes three thin tubes, namely, a tube 142, a waste liquid tube 224 (i.e., an upstream internal passage), and a tube 226 (see FIG. 4). The waste liquid tube 224 is coupled to the waste liquid passage 220 of the blood purification apparatus 200. The tube 142 is coupled to the reagent container 140 that is a reagent supply unit. The tube 226 is coupled to a discharge tube 222 for discharging the waste liquid from the chemiluminescence analyzer 100.

In the example structure illustrated in FIG. 2, for example, discharge tube 222 is coupled to a waste liquid treatment unit 240 to treat waste liquid discharged from the blood purification apparatus 200. Alternatively, the discharge tube 222 can be coupled to a waste liquid container to store the waste liquid from the blood purification apparatus 200.

The liquid analyzed by the chemiluminescence analyzer 100 is not limited to the waste liquid discharged from the blood purification apparatus 200 and can include urine or a diluted urine solution. The structure of the reagent container 140, which is the reagent supply unit, includes, for example, as a reagent tank and a reagent cartridge.

Next, an operation relating to the reaction and chemiluminescence will be described.

Inside the reactor 111, the waste liquid 201 discharged from the blood purification apparatus 200 and the reagent 141 are mixed and cause a chemical reaction. As a result, chemiluminescence occurs.

The photodetector 112 convers the light to an electric signal and transmits the electric signal to the controller 130.

The waste liquid conveyor 113 and the reagent conveyor 114 convey the waste liquid 201 and the reagent 141 to the reactor 111, respectively. As the waste liquid 201 and the reagent 141 are conveyed, the liquid mixture 181 including the waste liquid 201 and the reagent 141 is automatically (naturally) discharged.

The discharged liquid mixture 181 is stored in a tank or a cartridge dedicated for the liquid mixture 181 or conveyed to the waste liquid treatment unit 240.

Next, the controller 130 and the communicator 160 will be described.

The controller 130 controls the waste liquid conveyor 113 and the reagent conveyor 114 (i.e., the liquid conveyors)

described above to convey the waste liquid 201 from the blood purification apparatus 200 and the reagent 141 to the reactor 111.

The controller 130 converts an electric signal output from the photodetector 112 into a urea concentration in the waste liquid 201.

A trigger for the start of measurement and data such as the converted urea concentration are received from and transmitted to the external device such as the external terminal 310 or the portable terminal 320 through the communicator 160.

The communicator 160 mainly performs the following operations.

The communicator 160 receives an instruction for the start or the forced stop of measurement from the external device such as the external terminal 310 or the portable terminal 320 and sends the received instruction to the controller 130.

The communicator 160 transmits a measurement result (urea concentration) to the external device such as the external terminal 310 or the portable terminal 320 when the measurement ends.

The communicator 160 transmits an error state of the chemiluminescence analyzer 100 to the external device such as the external terminal 310 or the portable terminal 320.

The chemiluminescence analyzer 100 enables prompt measurement of the urea concentration in the waste liquid 201 discharged from the blood purification apparatus 200 during blood purification. Thus, users can know the state of blood purification in real time.

The following can be achieved when the measured data is transmitted to the external device such as the external terminal 310 or the portable terminal 320.

An appropriate end timing of blood purification by the blood purification apparatus 200 can be determined based on the urea concentration in the waste liquid 201 discharged from the blood purification apparatus 200, measured by the chemiluminescence analyzer 100.

With a computer or a server used as the external terminal 310, long-term accumulation of data can be used to know the health of a patient and give advice for the improvement of living habits.

Further, when a different blood purification apparatus and a different dialysate are used, for example, in a disaster or during a travel, the accumulated data can be utilized to reproduce the same blood purification state. Accordingly, a preferable blood purification speed and the amount of urea in the blood at the end of blood purification can be can be maintained to prevent a health problem of a patient.

On the other hand, although similar to the external terminal 310 such as the computer or the server, the portable terminal 320 can be utilized for health care of a patient by himself or herself.

The chemiluminescence analyzer 100 described above can be either incorporated inside the blood purification apparatus 200 or installed outside the blood purification apparatus 200.

The chemiluminescence analyzer 100 can have a single case instead of two divided cases described above. In such a case, the basic structure can be as follows.

Figure 3:
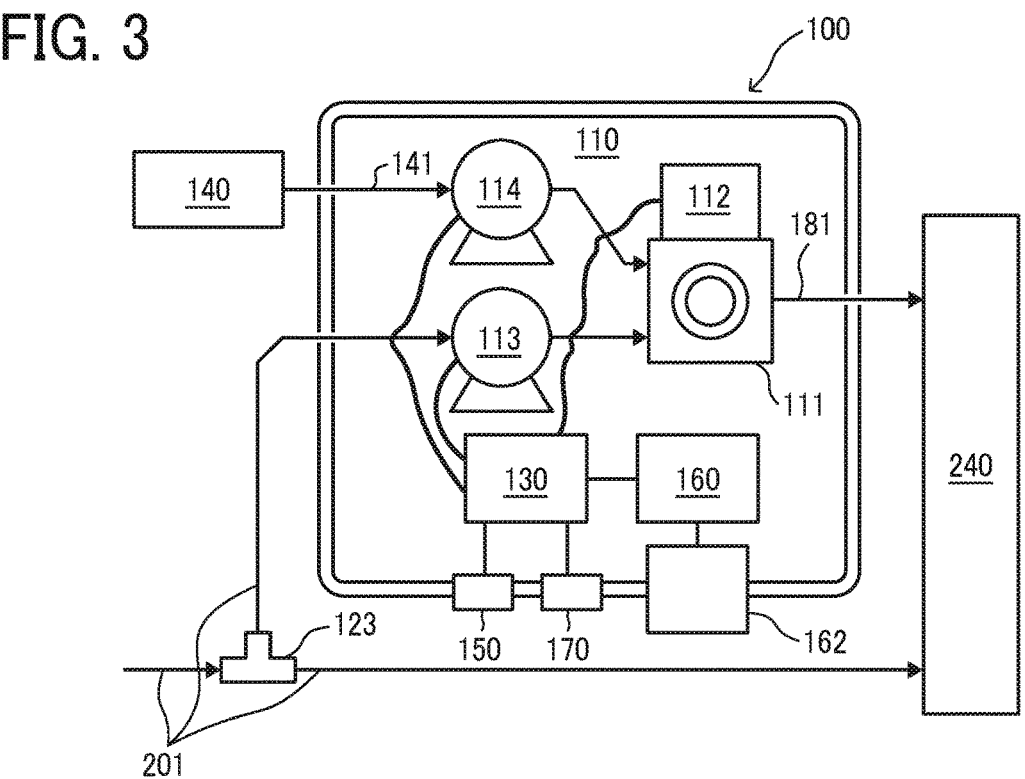
FIG. 3 is an explanatory diagram illustrating a basic configuration of a chemiluminescence analyzer having one case (not divided) according to an embodiment.

FIG. 3 is an explanatory diagram illustrating the basic configuration of the chemiluminescence analyzer 100 including one case.

Similar to the configuration including the two cases illustrated in FIG. 2, the electric interface 165 can be disposed inside the case of the chemiluminescence analyzer 100 illustrated in FIG. 3. Alternatively, as illustrated in FIG. 3, the controller 130 can be directly connected to the electric parts and the electronic parts. This configuration can make the structure of the chemiluminescence analyzer 100 simpler although the effects of dividing the case into two are not attained.

Next, descriptions are given below of modification of the basic configuration illustrated in FIG. 2, to eliminate the difficulty in installation or transport of the chemiluminescence analyzer 100 and further improve the accuracy of measurement.

For example, as illustrated in FIG. 2, the basic configuration of the chemiluminescence analyzer 100 uses a joint 123, such as a three-way joint, externally disposed to introduce the waste liquid 201 into the chemiluminescence analyzer 100 from the waste liquid passage 220 (a relay tube 221) of the blood purification apparatus 200.

Thus, as illustrated in FIG. 1, at the installation of the chemiluminescence analyzer 100, the joint 123 illustrated in FIG. 2 is coupled between the chemiluminescence analyzer 100 and a waste liquid port 211 (illustrated in FIG. 1) of the blood purification apparatus 200 placed on a floor 231 of a location 230. Further, in FIG. 1, a drain tube 232 is installed on the floor 231 of the location 230 for the blood purification apparatus 200, and the waste liquid treatment unit 240 is provided for the blood purification apparatus 200. When the liquid mixture 181 discharged from the chemiluminescence analyzer 100 is merged into the drain tube 232 to be discharged to the waste liquid treatment unit 240, a receiving portion of the drain tube 232 requires processing for such connection.

Thus, the chemiluminescence analyzer 100 of the present embodiment is modified as follows.

FIG. 3 is an explanatory diagram illustrating the features of the chemiluminescence analyzer 100 modified to eliminate the above-mentioned inconveniences.

The chemiluminescence analyzer 100 illustrated in FIG. 3 includes, in addition to the basic configuration described with reference to FIG. 2, a tank 115 to store a predetermined amount of waste liquid 201 discharged from the blood purification apparatus 200, various meters, and coupling ports for introducing and discharging the waste liquid 201 and the liquid mixture 181. Differently from the basic configuration, the joint 123 is disposed in the analyzer interior 110 and the chemiluminescence analyzer 100 further includes a non-return valve 124. The joint 123 couples a liquid mixture passage 228 to convey the liquid mixture 181 after the reaction in the reactor 111 to the waste liquid passage 220 of the blood purification apparatus 200.

Specifically, the tank 115 stores a predetermined amount of waste liquid 201 conveyed from the blood purification apparatus 200 to the reactor 111. The various meters include a tank liquid thermometer 115a to measure the temperature of the waste liquid 201 inside the tank 115 and a reagent thermometer 120 to measure the temperature of the reagent 141 passed through the reagent conveyor 114. The various meters also include a waste liquid flowmeter 117 to measure a flow rate of the waste liquid 201 conveyed by the waste liquid conveyor 113 and a liquid mixture flowmeter 119 to measure a flow rate of the liquid mixture 181 discharged from the reactor 111.

The chemiluminescence analyzer 100 illustrated in FIG. 4 includes a waste liquid port 125 (a waste liquid inlet), a cleaning and calibration port 126, and a reagent port 127 respectively to introduce the waste liquid 201, cleaning liquid or calibration liquid, and the reagent 141 into the analyzer interior 110; and an exit port 128 to discharge the liquid mixture 181 outside the analyzer.

The chemiluminescence analyzer 100 further includes the joint 123 to couple the liquid mixture passage 228 to the waste liquid passage 220 of the blood purification apparatus 200 and the non-return valve 124 to prevent the liquid mixture 181 from flowing toward the tank 115 from the joint 123.

The tank 115 stores the waste liquid 201 discharged from the blood purification apparatus 200. Note that the waste liquid port 125 and the cleaning and calibration port 126 can be disposed at the tank 115.

The waste liquid conveyor 113 conveys the stored waste liquid 201 from the tank 115 to the reactor 111 at the time of urea concentration measurement.

The capacity of the tank 115 is preferably determined according to the amount of waste liquid 201 required for the reaction in the reactor 111.

When the waste liquid 201 discharged from the blood purification apparatus 200 stays inside the tank 115 for a long time, an old waste liquid 201 and a new waste liquid 201 are mixed, which causes an error in the concentration measurement. Thus, the passage inside the tank 115 is preferably designed to push, with the new waste liquid 201, the old waste liquid 201 out of the tank 115.

The flow rate of the waste liquid 201 discharged from the blood purification apparatus 200 varies according to the operation of the blood purification apparatus 200. Even when the waste liquid flow rate is reduced or the discharge of the waste liquid is stopped, the tank 115 can prevent a measurement error caused by a shortage of waste liquid.

Since the tank 115 to store the waste liquid 201 is provided, the waste liquid conveyor 113 is disposed between the tank 115 and the reactor 111 to convey the waste liquid 201 from the tank 115 to the reactor 111.

When the tank 115 coupled to the waste liquid passage 220 and housed in the analyzer interior 110 is disposed on upstream from the waste liquid conveyor 113 in the direction of conveyance of the waste liquid 201, the following effect can be achieved.

Since the tank 115 is disposed in the analyzer interior 110, measurement can be performed without being affected by fluctuations in flow rate of the waste liquid 201 discharged from the blood purification apparatus 200.

The joint 123 includes a three-way joint and couples the liquid mixture passage 228, through which the liquid mixture 181 discharged from the reactor 111 flows, to the waste liquid passage 220 of the blood purification apparatus 200 in order to discard the liquid mixture 181 to the waste liquid passage 220.

The waste liquid port 125 is a joint disposed between the blood purification apparatus 200 and the tank 115 to detachably attach the chemiluminescence analyzer 100 to the blood purification apparatus 200. Examples of the joint include a quick joint and a luer fitting.

In other words, the chemiluminescence analyzer 100 includes the waste liquid port 125 to couple a part of the waste liquid passage 220 (e.g., the relay tube 221) located outside the analyzer and upstream from the analyzer in the direction of flow of the waste liquid 201 to the waste liquid tube 224 (a part of the waste liquid passage 220) located inside the chemiluminescence analyzer 100.

Accordingly, the waste liquid port 125 of the chemiluminescence analyzer 100 enables coupling with the waste liquid passage 220 of the blood purification apparatus 200. Thus, attachment and detachment of the chemiluminescence analyzer 100 are easy.

The exit port 128 is a joint disposed between the drain tube 232 on the floor 231 of the location 230 of installation and the joint 123 to detachably attach the chemiluminescence analyzer 100 to the blood purification apparatus 200.

In other words, the chemiluminescence analyzer 100 includes the exit port 128 to couple a part of the waste liquid passage 220 (the discharge tube 222) located outside the analyzer on the downstream side in the direction of flow of the waste liquid 201 to the part of the waste liquid passage 220 (e.g., the tube 226) located inside the analyzer.

Accordingly, the exit port 128 of the chemiluminescence analyzer 100 enables coupling with the waste liquid passage 220 of the blood purification apparatus 200, that is, enables coupling with the passage leading to the drain tube 232. Thus, attachment and detachment of the chemiluminescence analyzer 100 are easy.

A reagent cartridge 140a is one example of the reagent container 140. The reagent cartridge 140a is a container that encloses the reagent 141, serving as a chemiluminescent reagent, which reacts with the waste liquid 201 to produce chemiluminescence. The reagent cartridge 140a is coupled to the reagent port 127 coupled to the reagent conveyor 114 to be described later.

Although the container can be in any form, the container is detachably attached to the chemiluminescence analyzer 100, and one container encloses a chemiluminescent reagent capable of performing one or more measurements.

The number of types of reagent 141 is not limited to one. For example, a chemiluminescent reagent and a sensitizer can be supplied from different containers. Thus, the number of reagent conveyors 114 is also not limited to one.

The reagent port 127 is a joint disposed between the reagent cartridge 140a and the reagent conveyor 114 to enable attachment and detachment of the reagent conveyor 114 and the reagent cartridge 140a (i.e., the reagent container) to each other.

In other words, the chemiluminescence analyzer 100 includes the reagent port 127 disposed between the reagent container 140 or the reagent cartridge 140a and the reagent conveyor 114.

Accordingly, the reagent port 127 of the chemiluminescence analyzer 100 enables coupling with the reagent container such as the reagent container 140 or the reagent cartridge 140a. Thus, replacement of the reagent container is easy.

If the reagent container such as the reagent cartridge 140a is not used, the reagent 141 is directly supplied from a container such as a tank.

The cleaning and calibration port 126 is different from the waste liquid port 125 and coupled to the tank 115. Through the cleaning and calibration port 126, a cleaning liquid or a standard urea solution for calibration can be introduced into the tank 115.

In other words, the chemiluminescence analyzer 100 includes the tank 115 to store the waste liquid 201, disposed in the waste liquid passage 220 upstream from the waste liquid conveyor 113 in the direction of flow of the waste liquid 201. The tank 115 includes the cleaning and calibration port 126 for coupling with the thin tube (e.g., a tube 223) different from the waste liquid passage 220 (e.g., the relay tube 221).

Accordingly, the cleaning liquid or the standard urea solution for calibration can be injected into the tank 115 through the cleaning and calibration port 126 of the chemiluminescence analyzer 100. Thus, cleaning or calibration (e.g., sensitivity calibration) can be performed with the chemiluminescence analyzer 100 kept coupled to the blood purification apparatus 200.

Note that liquid inside the tank 115 leaks out when the cleaning and calibration port 126 is open. Accordingly, when the cleaning and calibration port 126 is not used, the cleaning and calibration port 126 is sealed not to open, or a check valve is disposed between the cleaning and calibration port 126 and the tank 115. Alternatively, a component including a built-in check valve, such as a coupling manufactured by Colder Products Company (CPC), can be used.

The non-return valve 124 is disposed between the tank 115 and the joint 123 in a direction for preventing liquid from flowing into the tank 115 from the joint 123.

When the blood purification apparatus 200 stops the discharge of the waste liquid 201 and the waste liquid conveyor 113 (a first liquid conveyor) operates to send out the waste liquid 201 from the tank 115, there arises a space free of liquid inside the tank 115. The liquid mixture 181 may reversely flow from the reactor 111 toward the tank 115 and enter the space.

The non-return valve 124 is capable of preventing an error in the urea concentration measurement caused by the mixing of the liquid mixture 181 from the reactor 111 into the tank 115 through the joint 123.

Next, an operation in practice will be described below.

The chemiluminescence analyzer 100 is installed between the blood purification apparatus 200 and the drain tube 232 disposed on the floor 231 on which the blood purification apparatus 200 is installed.

The waste liquid 201 discharged from the blood purification apparatus 200 is taken into the analyzer interior 110 through the waste liquid port 125 and passes through the tank 115. The waste liquid 201 is then discharged through the exit port 128. Specifically, the waste liquid port 125 is coupled to the waste liquid port 211 of the blood purification apparatus 200. The exit port 128 is coupled to the drain tube 232.

One non-return valve 124 and one joint 123 are disposed between the tank 115 and the exit port 128. Objects and functions of the non-return valve 124 and the joint 123 will be described in more detail later. The waste liquid conveyor 113 is coupled to the tank 115. The waste liquid conveyor 113 is capable of conveying the waste liquid 201 discharged from the blood purification apparatus 200, passing through the tank 115, to the reactor 111.

In addition, the chemiluminescence analyzer 100 includes the reagent port 127.

The reagent cartridge 140a as the reagent container 140 is detachably attached to the reagent port 127. The reagent conveyor 114 is coupled to the reagent port 127 to convey the reagent 141 from the reagent cartridge 140a to the reactor 111.

Although only one pair of the reagent port 127 and the reagent conveyor 114 is illustrated in FIG. 4, the chemiluminescence analyzer 100 can include pairs of reagent ports and reagent conveyors.

Further, the chemiluminescence analyzer 100 can optionally include the cleaning and calibration port 126 which is a utility port for calibration or cleaning of the chemiluminescence analyzer 100.

Calibration and cleaning operations will be described later.

Next, an operation relating to the reaction and chemiluminescence will be described.

As described above, the waste liquid conveyor 113, serving as the liquid conveyor, is coupled to the tank 115 to convey the waste liquid 201 from the blood purification apparatus 200 to the reactor 111. Further, the reagent conveyor 114, serving as another liquid conveyor, is coupled to the reagent port 127 to draw the reagent 141 from the reagent cartridge 140a (the reagent container 140) into the reactor 111.

Inside the reactor 111, the waste liquid 201 and the reagent 141 are mixed, which causes a chemical reaction. As a result, chemiluminescence occurs. The photodetector 112 coupled to the reactor 111 convers the light to an electric signal and transmits the electric signal to the controller 130. The liquid mixture 181 including the waste liquid 201 and the reagent 141 after the reaction is discharged from the reactor 111.

The liquid mixture passage 228 for the liquid mixture 181 is coupled to the waste liquid passage 220 of the blood purification apparatus 200 through the joint 123 (three-way joint). Thus, the liquid mixture 181 is discarded through the waste liquid passage 220 together with the waste liquid 201 from the blood purification apparatus 200.

The joint 123 is also coupled to the tank 115. Thus, when the blood purification apparatus 200 stops the discharge of the waste liquid 201, the liquid mixture 181 after the reaction may flow into the tank 115 through the joint 123. If the liquid mixture 181 flows into the tank 115, the waste liquid from the blood purification apparatus 200 and the liquid mixture 181 are disadvantageously mixed inside the tank 115. When the waste liquid conveyor 113 draws up the mixture of the waste liquid and the liquid mixture 181 and conveys the mixture to the reactor 111, a significant error occurs in the urea concentration detection.

In order to prevent such an error, the non-return valve 124 is disposed between the joint 123 and the tank 115 so as to prevent the liquid mixture 181 from flowing into the tank 115.

The flow rate, the flow speed, and the mixing ratio of the waste liquid 201 and the reagent 141 (the chemiluminescence reagent) conveyed to the reactor 111 are factors to increase or decrease the amount of chemiluminescence, resulting in an error in the detection of the component concentration in the waste liquid 201. In order to reduce or eliminate the error, preferably, a flowmeter is disposed on any of the waste liquid passage 220, the passage for the reagent 141, and the liquid mixture passage 228 for the liquid mixture 181 discharged from the reactor 111.

Similarly, the temperature of the waste liquid 201 and the reagent 141 conveyed to the reactor 111 is another factor to increase or decrease the amount of chemiluminescence. To avoid or suppress changes in the amount of luminescence, preferably a thermometer is disposed in one of the waste liquid passage 220 from the blood purification apparatus 200, the passage for the reagent 141, and the liquid mixture passage 228 extending from the reactor 111.

In view of the foregoing, the modified structure illustrated in FIG. 4 includes a tank liquid thermometer 115a to measure a temperature of the waste liquid 201 inside the tank 115 and a waste liquid flowmeter 117 to measure a flow rate between the waste liquid conveyor 113 and the reactor 111. Further, the reagent thermometer 120 is disposed between the reagent conveyor 114 and the reactor 111 to measure the temperature of the reagent 141. The liquid mixture flowmeter 119 is disposed between the reactor 111 and the joint 123 to measure the flow rate of the liquid mixture 181.

A value detected by the photodetector 112 or the component concentration in the waste liquid 201 obtained by the controller 130 is corrected using the flow rate or the temperature in each location measured by each of the meters. As a result, an error in the detected component concentration can be inhibited, and the cause of the detection error can be eliminated.

The waste liquid conveyor 113 (the first liquid conveyor), the reagent conveyor 114 (the second liquid conveyor), the photodetector 112, and the various meters described above are coupled, via the electric interface 165, to the controller 130.

Note that, since the chemiluminescence analyzer 100 includes the electric interface 165, the controller 130 can be mounted in an external device. For example, the control and communication unit 102 can be an external device.

The controller 130 mainly operates each of the units and the above-mentioned devices and converts a signal received from the photodetector 112 into the urea concentration in the waste liquid 201 discharged from the blood purification apparatus 200.

More specifically, an operation as described below is performed.

When the controller 130 receives a command for the start of measurement from the communicator 160 or the control panel 170 or a time stored in a timer in the controller 130 has elapsed, the controller 130 operates each of the liquid conveyors to convey the waste liquid 201 from the blood purification apparatus 200 and the reagent 141 to the reactor 111. Accordingly, chemiluminescence is produced inside the reactor 111.

At this time, an output signal from each of the flowmeters is monitored. In some case, the operation of the liquid conveyor is adjusted so that the flow rate becomes a desired flow rate. In some cases, the photodetector is corrected using the output signal.

Then, the photodetector 112 outputs an electric signal corresponding to the amount of received light. The controller 130 receives the electric signal and converts the received electric signal into a urea concentration. The controller 130 can correct output signal from the photodetector 112, a formula to convert the signal into the urea concentration, or both, using temperature data detected by each of the thermometers.

When the output signal from the photodetector 112, flow rate data, and temperature data are obtained, the operation of each of the liquid conveyors is stopped.

Finally, a measurement result is transmitted to the external device such as the external terminal 310 or the portable terminal 320 and displayed on the display 150 through the communicator 160. Simultaneously with the transmission and the display, the timer in the controller 130 can be set to the next measurement timing. The time required for such processing is approximately from several seconds to one minute.

Similar to the above-described basic structure, the chemiluminescence analyzer 100 illustrated in FIG. 4 can be modified to have a single case instead of two divided cases described above. Such an example is described below.

Figure 5:
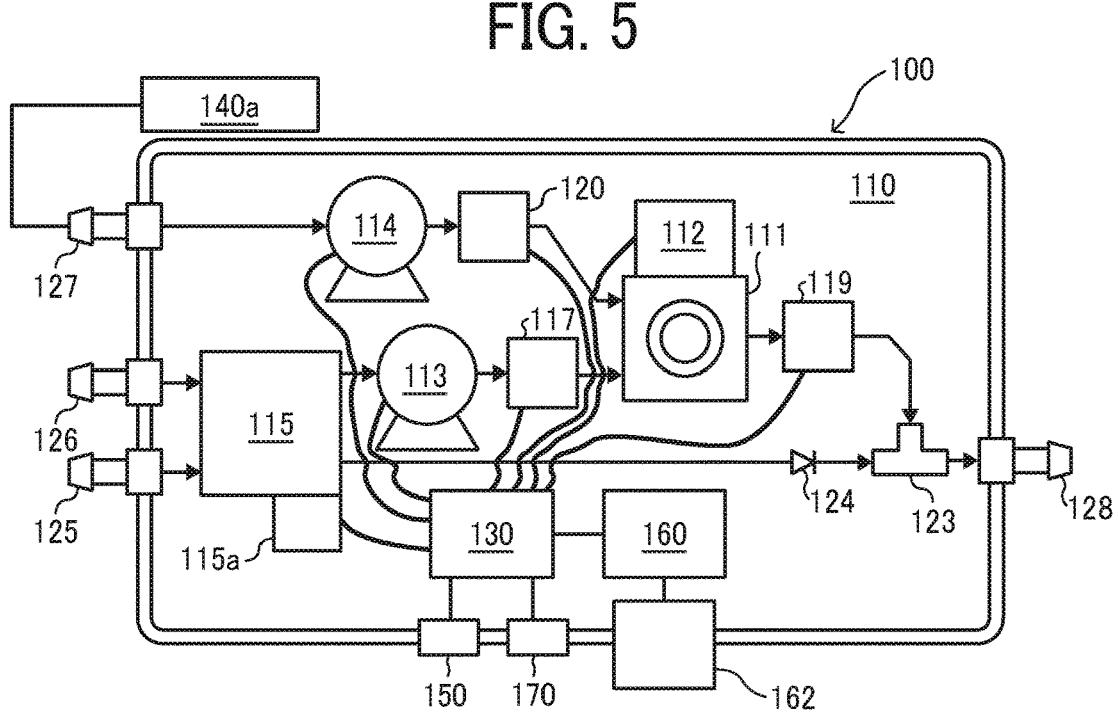
FIG. 5 is an explanatory diagram illustrating another structure of the chemiluminescence analyzer having one case.

FIG. 5 is an explanatory diagram of the chemiluminescence analyzer 100 having one case.

Similar to the configuration including the two cases illustrated in FIG. 4, the electric interface 165 can be disposed inside the case in the chemiluminescence analyzer 100 including one case. Alternatively, as illustrated in FIG. 5, the controller 130 can be directly connected to the electric parts and the electronic parts. This configuration can make the structure of the chemiluminescence analyzer 100 simpler although the effects of dividing the case into two, described below, are not attained. Thus, installation of the chemiluminescence analyzer 100 can be easy.

In the configuration in which the case is divided into the two cases of the conveyance and reaction unit 101 and the control and communication unit 102, the electric parts and the electronic parts inside the conveyance and reaction unit 101 are connected to the controller 130 via the electric interface 165.

Figure 6:
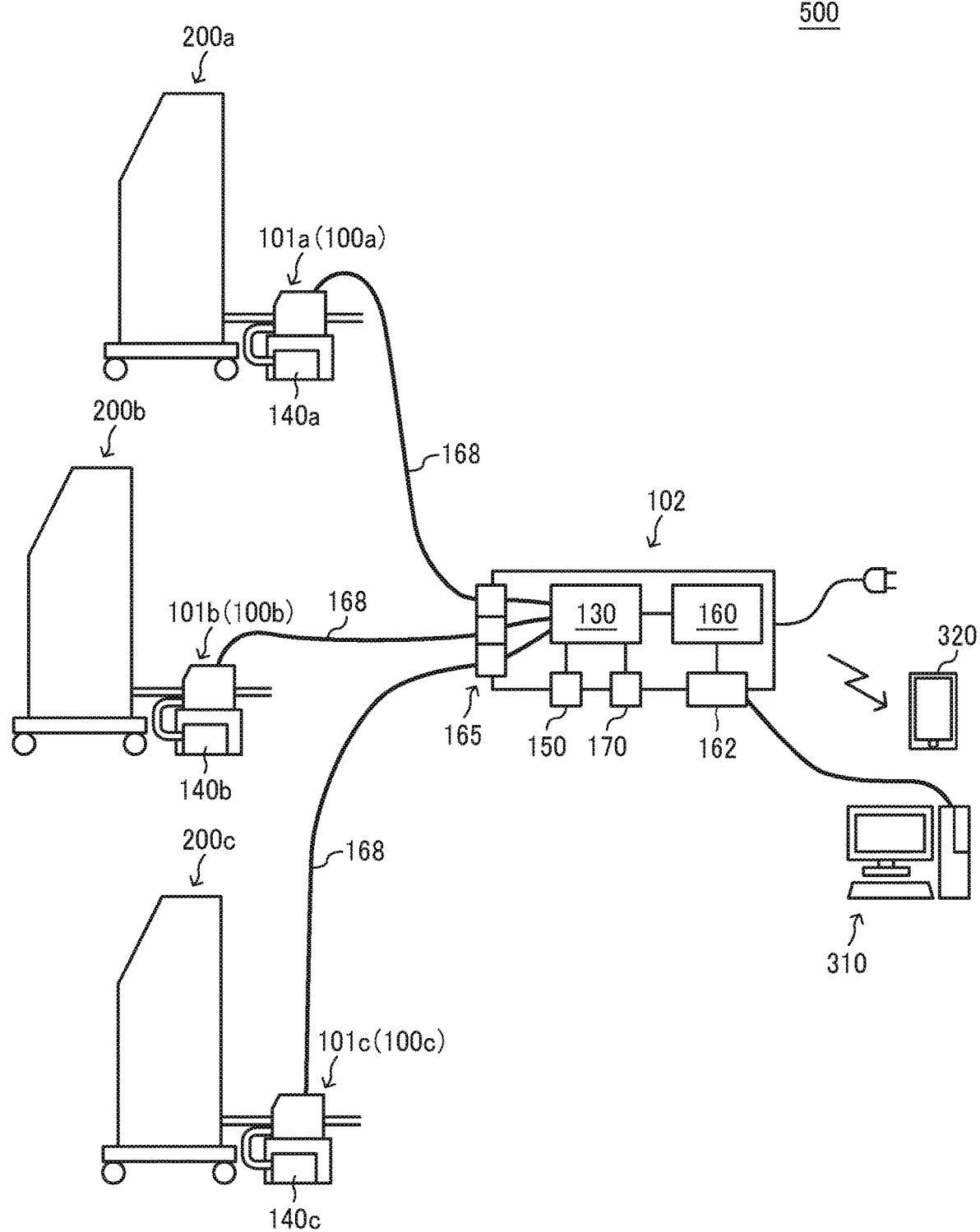
FIG. 6 is a schematic diagram of a blood purification system in which one common controller controls conveyance and reaction units respectively coupled to a plurality of blood purification apparatuses, according to an embodiment.

This configuration can be modified to control a plurality of chemiluminescence analyzers with one controller, for example, as illustrated in FIG. 6.

FIG. 6 is a schematic diagram of a blood purification system 500 in which a common controller 130 of one control and communication unit 102 controls conveyance and reaction units 101a, 101b, and 101c (also collectively "conveyance and reaction units 101") respectively coupled to a plurality of blood purification apparatuses 200a, 200b, and 200c (also collectively "blood purification apparatuses 200").

As illustrated in FIG. 6, via the electric interfaces 165, the common controller 130 inside one control and communication unit 102 is connected to the electric parts and electronic parts of the conveyance and reaction unit 101a, 101b, and 101c respectively provided to the three the blood purification apparatuses 200a, 200b, and 200c.

The common controller 130 controls the conveyance and reaction unit 101a, 101b, and 101c, that is, three chemiluminescence analyzers 100a, 100b, and 100c, respectively coupled to the three blood purification apparatuses 200a, 200b, and 200c.

In the configuration illustrated in FIG. 6, via the electric interfaces 165 coupling the conveyance and reaction units 101 to the controller 130 inside the control and communication unit 102, power is supplied to the electric parts and the electronic parts of the conveyance and reaction units 101. Accordingly, the conveyance and reaction units 101 are connected via power supply and signal lines 168 to the controller 130.

This configuration can further facilitate installation of the chemiluminescence analyzer 100, the blood purification apparatus 200, and the blood purification system 500.

Next, a cleaning method will be described.

The waste liquid 201 discharged from the blood purification apparatus 200 contains a dialysate component and a waste product of the human body. The dialysate component and the waste product adhere to the thin tubes for conveyance, the tank 115, and the reactor 111.

When the chemiluminescence analyzer 100 is coupled to the blood purification apparatus 200, the cleaning liquid of the blood purification apparatus 200 flows through the analyzer interior 110. Thus, the dialysate component and waste product are removed to some extent.

However, the cleaning liquid is introduced into the chemiluminescence analyzer 100 after cleaning the blood purification apparatus 200, and thus has a reduced cleaning effect. Further, the cleaning liquid does not automatically flow through the liquid conveyance passages through which the liquid is conveyed by the liquid conveyors such as the waste liquid conveyor 113.

When no cleaning is performed, dirt or scale adheres to and accumulates inside the reactor 111 and on the various meters, which reduces the sensitivity or the measurement accuracy of the reactor 111 and the meters.

In view of the above, there is a demand for cleaning the analyzer interior 110.

In practical cleaning, a cleaning liquid can be introduced through the waste liquid port 125 which takes in the waste liquid 201 for the waste liquid passage 220 through which the waste liquid 201 from the blood purification apparatus 200 passes.

Specifically, the following procedure is performed.

(1) When no blood purification is performed, the waste liquid conveyor 113 is driven to remove liquid remaining inside the tank 115 to some extent.

(2) The waste liquid passage 220 of the blood purification apparatus 200 and the waste liquid port 125 are detached from each other, and the cleaning liquid is injected through the waste liquid port 125.

(3) The waste liquid conveyor 113 is driven to convey the cleaning liquid from the tank 115 to the reactor 111.

In the chemiluminescence analyzer that does not include the non-return valve 124 described above, the coupling between the exit port 128 and the discharge tube 222 is released, and the exit port 128 is closed. As a result, the cleaning liquid circulates through the analyzer interior 110, which improves the cleaning efficiency.

In the above method using the inlet port, it is required to release the coupling between the chemiluminescence analyzer 100 and the blood purification apparatus 200 every time cleaning is performed, which is inconvenient.

Thus, another port coupled to the tank 115, the cleaning and calibration port 126, is added.

The cleaning liquid is injected to the tank 115 through the added cleaning and calibration port 126, and each of the liquid conveyors is driven in synchronization with the injection. As a result, the reactor 111 can be cleaned. Further, when the added cleaning and calibration port 126 is used, cleaning can be performed also in the middle of blood purification.

Installing a sealer or a check valve is an approach to prevent the waste liquid 201 discharged from the blood purification apparatus 200 from leaking out through the added cleaning and calibration port 126.

The cleaning liquid can be injected through the reagent port 127 to clean the passage for the reagent 141.

The component of the cleaning liquid can be similar to the component of the cleaning liquid for the blood purification apparatus 200. However, it is required to prevent chemical reaction between the reagent 141 and the cleaning liquid resulting in generation of a harmful material.

An approach to prevent such an inconvenience is limiting the component of the cleaning liquid or washing the reagent 141 away with water or hot water (can be pure water or purified water) before introducing the cleaning liquid.

Since the dirt includes those derived from the waste product of the human body and calcium contained in the dialysate (scale), use different cleaning liquids for the waste product and the scale is preferred. Therefore, the latter method more conforms to the practice.

Next, calibration will be described.

The calibration is performed to prevent, in addition to the dirt of the reactor 111 described above, an error in the detection of the urea concentration caused by sensitivity fluctuations due to a deterioration of the photodetector 112.

Basically, for the calibration, a measurement operation is performed while injecting a solution having a known urea concentration into the tank 115 of the chemiluminescence analyzer 100.

Either the waste liquid port 125 or the added cleaning and calibration port 126 can be used as an injection path for a calibration urea solution similarly to the cleaning.

Next, operations other than the measurement will be described.

As described, the communicator 160 performs transmission and reception of a command for the start of measurement and measurement data. In addition, the communicator 160 mainly performs operations as described below.

First, the communicator 160 performs an operation for notifying the external device of the state of the chemiluminescence analyzer.

Second, the communicator 160 performs an operation for communication of a command such as an emergency stop of measurement.

The above two operations are merely examples. The communicator 160 can perform other operations.

The control panel 170 is for an operation relating to measurement and operations relating to cleaning and calibration, stopping the cleaning and the calibration, communication, and display, and includes buttons and switches for these operations.

The display 150 performs various displays in conjunction with various operations in addition to the display of results. Thus, preferably, the display 150 includes a lamp and a display capable of performing character representation. An integrated structure including the display 150 and the control panel 170 such as a touch panel display can also be used.

The chemiluminescence analyzer 100 modified as illustrated in FIG. 4 is configured to be installed outside the blood purification apparatus 200, differently from the configuration illustrated in FIG. 2. Thus, the chemiluminescence analyzer 100 illustrated in FIG. 4 includes the control panel 170 and the display to enable standalone operation.

Thus, the chemiluminescence analyzer 100 illustrated in FIG. 4 can also be operated independently as needed. In such an operation, the test object is not limited to urea.

An example layout of main devices of the chemiluminescence analyzer 100 will be described with reference to the drawing.

Figure 7:
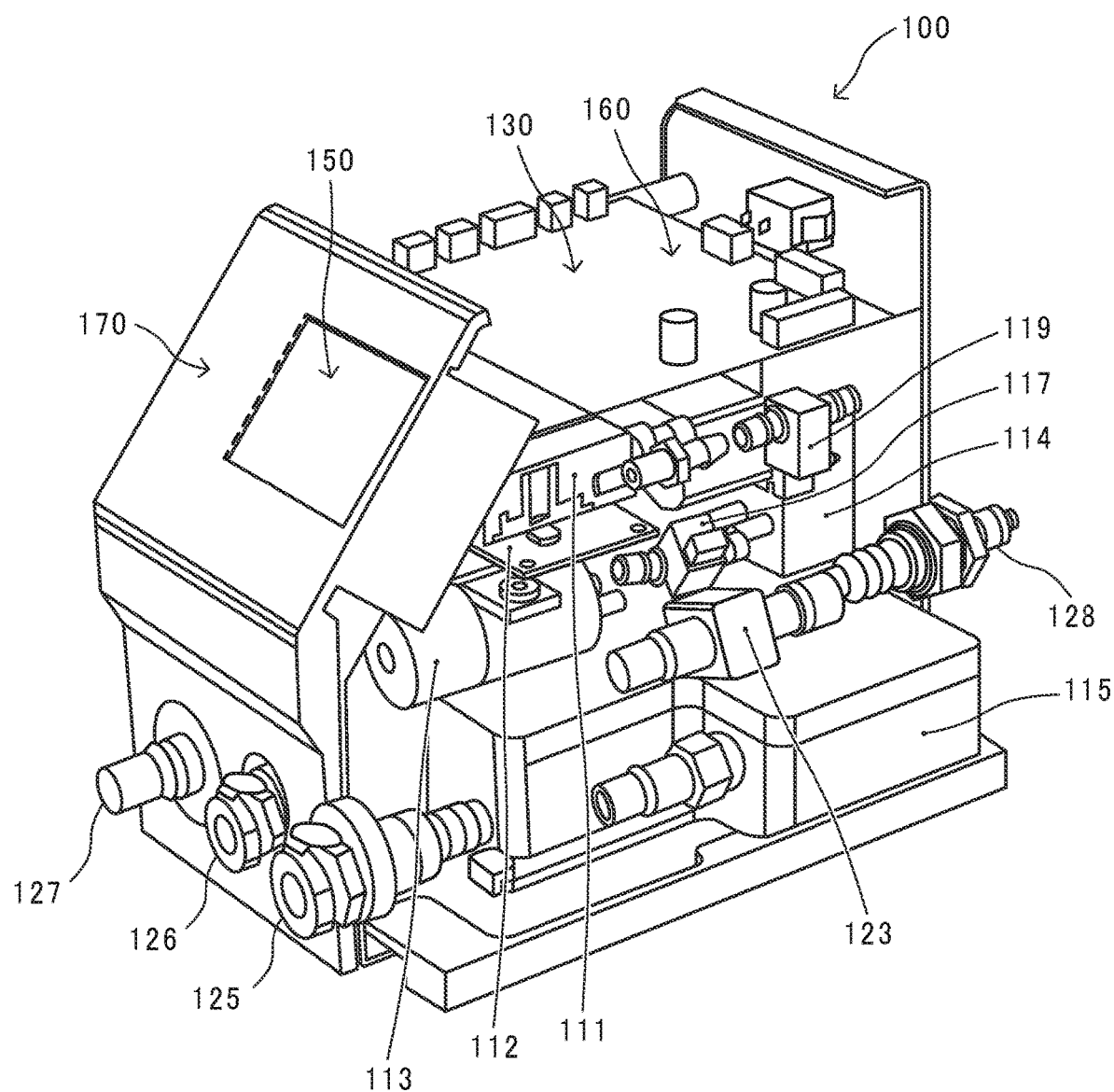
FIG. 7 is a perspective view of main devices of the chemiluminescence analyzer with a case thereof partly omitted to illustrate an interior of the chemiluminescence analyzer.

FIG. 7 is a perspective view of main devices of the modified chemiluminescence analyzer with a case thereof partly omitted to illustrate an interior of the chemiluminescence analyzer.

As illustrated in FIG. 7, the modified chemiluminescence analyzer 100 includes the control panel 170 and the display 150 which are disposed on an inclined face on the front side at the upper left in FIG. 7. The waste liquid port 125, the cleaning and calibration port 126, and the reagent port 127 are disposed in this order from the right (the near side) in FIG. 7 on a side face (front face) below the inclined face. On the other hand, the exit port 128 for discharging the liquid mixture 181 after reaction is disposed on a side face on the back side at the lower right in FIG. 7.

In the analyzer interior 110 (see FIG. 4) behind the inclined face including the control panel 170 and the display 150 in FIG. 4, a substrate including the controller 130 and the communicator 160 is disposed at the uppermost part, and the reactor 111 and the photodetector 112 are disposed below the substrate. The waste liquid conveyor 113, the reagent conveyor 114, the liquid mixture flowmeter 119, the waste liquid flowmeter 117, and the joint 123 are disposed further below the reactor 111 and the photodetector 112, and the tank 115 is disposed further below.

Since FIG. 7 illustrates the main devices in the perspective manner as viewed from a cross section. Thus, the tank liquid thermometer 115a, the reagent thermometer 120, and the non-return valve 124 are invisible or omitted in FIG. 7.

The thermometers and the non-return valve 124 invisible or omitted in FIG. 7 are disposed near the device to which the thermometer or the check valve is coupled, as illustrated in FIG. 4 or 5.

As described above, according to one aspect of this disclosure, the chemiluminescence analyzer 100 includes the reactor 111, which causes a reaction between the waste liquid 201 discharged from the blood purification apparatus 200 and the reagent 141, and the photodetector 112 to measure the intensity of chemiluminescence arising in the reactor 111. The chemiluminescence analyzer 100 further includes the waste liquid conveyor 113 to convey the waste liquid 201 from the waste liquid passage 220 of the blood purification apparatus 200 to the reactor 111 and the reagent conveyor 114 to convey the reagent 141 to the reactor 111. In addition, the chemiluminescence analyzer 100 further includes the joint 123 to couple the liquid mixture passage 228 for the liquid mixture 181 after reaction to the waste liquid passage 220 of the blood purification apparatus 200, and the electric interface 165.

Such a configuration achieves effects as described below.

Since the electric interface 165 is provided, the controller 130 can be separated from the main portion of the chemiluminescence analyzer 100 as illustrated in FIG. 2 or 4. Then, components of the chemiluminescence analyzer 100 can be housed in separate cases such as the conveyance and reaction unit 101, which contains the photodetector 112 and the like, and the control and communication unit 102, which contains the controller 130, thereby enhancing the flexibility in installation (layout).

Since a plurality of chemiluminescence analyzers 100 can be controlled by the common controller 130, centralized control is available. Further, the component concentration of each of a plurality of samples can be measured with a common measurement instrument.

In addition, since the analyzer interior 110 includes the joint 123 for the waste liquid 201, the liquid mixture 181 discharged from the reactor 111 can be discarded to the waste liquid passage 220 of the blood purification apparatus 200. As a result, the discharge passage can be easily secured.

Thus, installation of the chemiluminescence analyzer 100 can be easy.

According to another aspect of this disclosure, the chemiluminescence analyzer 100 includes the reactor 111 to cause a reaction between the waste liquid 201 discharged from the blood purification apparatus 200 and the reagent 141 and the photodetector 112 to measure the intensity of chemiluminescence arising in the reactor 111. The chemiluminescence analyzer 100 further includes the waste liquid conveyor 113 to convey the waste liquid 201 from the waste liquid passage 220 of the blood purification apparatus 200 to the reactor 111, the reagent conveyor 114 to convey the reagent 141 to the reactor 111, and the controller 130 configured to control the photodetector 112, the waste liquid conveyor 113, and the reagent conveyor 114. The chemiluminescence analyzer 100 further includes the communicator 160 to communicate with the external terminal 310 and the portable terminal 320 and the joint 123 to couple the liquid mixture passage 228 for the liquid mixture 181 to the waste liquid passage 220 of the blood purification apparatus 200.

Such a configuration achieves effects as described below.

The controller 130 and the communicator 160 enable the chemiluminescence analyzer 100 to independently operate in response to a command received from the external terminal 310 or the portable terminal 320 via the communicator 160. In addition, when the chemiluminescence analyzer 100 is incorporated in the blood purification apparatus 200, this configuration can reduce electric wiring in the blood purification apparatus 200 and the chemiluminescence analyzer 100 and also simplify instructions for the operation of the chemiluminescence analyzer 100. Thus, incorporating the chemiluminescence analyzer 100 is easy.

In addition, since the analyzer interior 110 includes the joint 123 for the waste liquid 201, the liquid mixture 181 discharged from the reactor 111 can be discarded to the waste liquid passage 220 of the blood purification apparatus 200. As a result, the discharge passage can be easily secured.

Thus, installation of the chemiluminescence analyzer 100 can be easy.

According to another aspect, the chemiluminescence analyzer 100 further includes the thermometers, such as the tank liquid thermometer 115a and the reagent thermometer 120, to measure the temperature of at least one of the waste liquid 201, the reagent 141, and the liquid mixture 181.

Such a configuration achieves effects as described below.

The temperature data at least one of the waste liquid 201 discharged from the blood purification apparatus 200, the reagent 141, and the liquid mixture 181 acquired with the thermometer can be used to correct, with the controller 130, the output signal of the photodetector 112. As a result, the influence of fluctuations in the intensity of chemiluminescence caused by the liquid temperature can be suppressed.

According to another aspect, the chemiluminescence analyzer 100 further includes the flowmeters, such as the waste liquid flowmeter 117 and the liquid mixture flowmeter 119, to measure the flow rate of at least one of the waste liquid 201, the reagent 141, and the liquid mixture 181.

Such a configuration achieves effects as described below.

The flow rate of at least one of the waste liquid 201 discharged from the blood purification apparatus 200, the reagent 141, and the liquid mixture 181, acquired by the flowmeter, can be used to correct the output signal of the photodetector 112, with the controller 130 also serving as the flow rate adjuster. As a result, the influence of fluctuations in the intensity of chemiluminescence caused by the flow rate or the mixing ratio can be reduced.

According to another aspect, the chemiluminescence analyzer 100 further includes the non-return valve 124 disposed as described below.

When the chemiluminescence analyzer 100 includes the tank 115 to store the waste liquid 201, disposed in the waste liquid passage 220 upstream from the waste liquid conveyor 113 in the direction of flow of the waste liquid 201, the non-return valve 124 is disposed between the tank 115 and the joint 123 to prevent the liquid mixture 181 from entering the tank 115. On the other hand, when the chemiluminescence analyzer 100 does not include the tank 115 (see FIG. 2), the non-return valve 124 is disposed to prevent the liquid mixture 181 from entering a portion of the waste liquid passage 220 through which the waste liquid 201 flows to the waste liquid conveyor 113.

Such a configuration achieves effects as described below.

The non-return valve 124 prevents the liquid mixture 181 discharged from the reactor 111 from flowing into the tank 115 or the waste liquid conveyor 113. Thus, it is possible to prevent an error in the urea concentration measurement caused by the mixing of the liquid mixture 181 into the tank 115 or the waste liquid conveyor 113.

The blood purification apparatus 200 of the present embodiment can include the chemiluminescence analyzer 100 having any of the configurations described above as a measuring instrument to measure a urea concentration in the waste liquid 201 discharged during blood purification.

Such a configuration enables the blood purification apparatus 200 to achieve an effect similar to the effect of the chemiluminescence analyzer 100 having any of the configurations described above.

The blood purification system 500 of the present embodiment can include the blood purification apparatus 200 to purify blood and the chemiluminescence analyzer 100 having any of the configurations described above as a measuring instrument to measure a urea concentration in the waste liquid 201 discharged from the blood purification apparatus 200.

Such a configuration enables the blood purification system 500 to achieve an effect similar to the effect of the chemiluminescence analyzer 100 having any of the configurations described above.

The structures described above are just examples, and various aspects of the present disclosure can attain, for example, the following effects, respectively. Aspect A Aspect A concerns a chemiluminescence analyzer (e.g., the chemiluminescence analyzer 100) that includes a reactor (e.g., the reactor 111) to cause waste liquid discharged from a blood purification apparatus (e.g., the blood purification apparatus 200) to react with a reagent solution (e.g., the reagent 141); and a photodetector (e.g., the photodetector 112) to measure an intensity of chemiluminescence arising in the reactor. The chemiluminescence analyzer further includes a first liquid conveyor (e.g., the waste liquid conveyor 113) to convey the waste liquid from a waste liquid passage (e.g., the waste liquid passage 220) of the blood purification apparatus to the reactor; a second liquid conveyor (e.g., the reagent conveyor 114) to convey the reagent solution to the reactor; a joint (e.g., the joint 123 such as a three-way joint) to couple, to the waste liquid passage, a liquid mixture passage (e.g., the liquid mixture passage 228) through which a liquid mixture (e.g., the liquid mixture 181) including the waste liquid and the reagent solution after reaction flows; and an electric interface (e.g., the electric interface 165) for communication between the chemiluminescence analyzer and an external device.

According to this aspect, as described above, for example,

Since the electric interface is provided, a controller (e.g., the controller 130) to control the chemiluminescence analyzer can be separated from the body of the chemiluminescence analyzer, and the controller can be housed in a case (e.g., the control and communication unit 102) separate from the case (e.g., the conveyance and reaction unit 101) in which the photodetector and the like are housed. Thus, the flexibility in installation (layout) improves.

Since a plurality of chemiluminescence analyzers can be controlled by a common controller, for example, centralized control is available. Further, component concentration of plurality of samples can be measured with a common measurement instrument.

In addition, with the joint 123 disposed inside chemiluminescence analyzer (e.g., the analyzer interior 110), the liquid mixture discharged from the reactor can be discarded to the waste liquid passage of the blood purification apparatus. As a result, the discharge passage can be easily ensured.

Thus, an easily installable chemiluminescence analyzer can be provided.

Aspect B

Aspect B concerns a chemiluminescence analyzer such as the chemiluminescence analyzer 100 includes a reactor (e.g., the reactor 111) to cause waste liquid discharged from a blood purification apparatus (e.g., the blood purification apparatus 200) to react with a reagent solution (e.g., the reagent 141); and a photodetector (e.g., the photodetector 112) to measure an intensity of chemiluminescence arising in the reactor. The chemiluminescence analyzer further includes a first liquid conveyor (e.g., the waste liquid conveyor 113) to convey the waste liquid from a waste liquid passage (e.g., the waste liquid passage 220) of the blood purification apparatus to the reactor; a second liquid conveyor (e.g., the reagent conveyor 114) to convey the reagent solution to the reactor; a controller (e.g., the controller 130) to control the photodetector, the first liquid conveyor, and the second liquid conveyor; a communicator (e.g., the communicator 160) to communicate with an external device such as the external terminal 310 and the portable terminal 320; and a joint (e.g., the joint 123) to couple, to the waste liquid passage of the blood purification apparatus, a liquid mixture passage (e.g., the liquid mixture passage 228) through which a liquid mixture including the waste liquid and the reagent solution flows after reaction.

According to this aspect, as described above, for example,

The controller and the communicator enable the chemiluminescence analyzer 100 to operate in a standalone manner in response to a command transmitted from the external device. In addition, when the chemiluminescence analyzer is incorporated in the blood purification apparatus, this aspect can reduce electric wiring between the blood purification apparatus and the chemiluminescence analyzer and also simplify instructions to operate the chemiluminescence analyzer. Thus, incorporating the chemiluminescence analyzer is easy.

In addition, with the joint 123 disposed inside chemiluminescence analyzer (e.g., the analyzer interior 110), the liquid mixture discharged from the reactor can be discarded to the waste liquid passage of the blood purification apparatus. As a result, the discharge passage can be easily ensured.

Thus, an easily installable chemiluminescence analyzer can be provided.

Aspect C

The chemiluminescence analyzer according to Aspect B further includes a control panel (e.g., the control panel 170) and a display (e.g., the display 150).

As described above, owing to the controller, the display, and the control panel, the chemiluminescence analyzer can operate in a standalone manner and is used independently.

Aspect D

The chemiluminescence analyzer according to any one of Aspects A to C further includes a tank (e.g., the tank 115) disposed in the waste liquid passage and upstream from the first liquid conveyor in the direction of flow of the waste liquid in the waste liquid passage, the tank to store the waste liquid.

As described above, since the tank is disposed inside the chemiluminescence analyzer, measurement can be performed without being affected by fluctuations in flow rate of the waste liquid discharged from the blood purification apparatus.

Aspect E

In any one of Aspects A through D, the chemiluminescence analyzer further includes a thermometer (e.g., the tank liquid thermometer 115a and the reagent thermometer 120) to measure temperature of at least one of the waste liquid, the reagent solution, and the liquid mixture.

According to this aspect, as described above, for example,

The temperature data of at least one of the waste liquid discharged from the blood purification apparatus, the reagent, and the liquid mixture, acquired with the thermometer, can be used to correct, with the controller, the signal output from the photodetector. Then, the influence of fluctuations in the intensity of chemiluminescence caused by the liquid temperature can be reduced.

Aspect F

The chemiluminescence analyzer according to any one of Aspects A through E further includes a flowmeter (e.g., the waste liquid flowmeter 117 and the liquid mixture flowmeter 119) to measure a flow rate of at least one of the waste liquid, the reagent solution, and the liquid mixture.

According to this aspect, as described above, for example,

The flow rate data of at least one of the waste liquid discharged from the blood purification apparatus, the reagent, and the liquid mixture, acquired with the flowmeter, can be used to correct, with a flow rate adjuster such as the controller 130, the signal output from the photodetector. Then, the influence of fluctuations in the intensity of chemiluminescence caused by the flow rate or mixing ratio can be reduced.

Aspect G

The chemiluminescence analyzer according to any one of Aspects A through F further includes an upstream internal passage (e.g., the waste liquid tube 224) disposed inside the analyzer, and a waste liquid connection (e.g., the waste liquid port 125) to connect the upstream internal passage to an upstream portion (e.g., the relay tube 221) of the waste liquid passage disposed outside and upstream from the chemiluminescence analyzer in the direction of flow of the waste liquid.

Accordingly, as described above, since the waste liquid connection of the chemiluminescence analyzer enables coupling with the waste liquid passage 220 of the blood purification apparatus, attachment and detachment of the chemiluminescence analyzer are easy.

Aspect H

The chemiluminescence analyzer according to any one of Aspects A through G further includes a downstream internal passage (e.g., the tube 226) disposed inside the analyzer, and a drain connection (e.g., the exit port 128) to connect the downstream internal passage to a downstream portion (the discharge tube 222) of the waste liquid passage disposed outside and downstream from the chemiluminescence analyzer in the direction of flow of the waste liquid.

Accordingly, as described above, since the drain connection of the chemiluminescence analyzer 100 enables coupling with the waste liquid passage 220 of the blood purification apparatus 200, attachment and detachment of the chemiluminescence analyzer 100 are easy.

Aspect I

The chemiluminescence analyzer according to any one of Aspects A through H further includes a reagent connection (e.g., the reagent port 127) disposed between the second liquid conveyor and a reagent container (e.g., the reagent container 140 and the reagent cartridge 140a) to contain the reagent solution, to couple the second liquid conveyor to the reagent container.

Accordingly, as described above, since the reagent connection disposed at the chemiluminescence analyzer enables coupling with the reagent container, replacement of the reagent container is easy.

Aspect J

The chemiluminescence analyzer according to any one of Aspects A through I further includes a tank (e.g., the tank 115) to store the waste liquid, disposed in the waste liquid passage upstream from the first liquid conveyor in the direction of flow of the waste liquid, and the tank includes another connection (the cleaning and calibration port 126) connected to a tube (e.g., the tube 223) different from the waste liquid passage.

Accordingly, as described above, the connection disposed at the chemiluminescence analyzer enables introduction of the cleaning liquid or the standard urea solution for calibration into the tank 115. Thus, cleaning or calibration can be performed with the chemiluminescence analyzer 100 kept coupled to the blood purification apparatus 200.

Aspect K

The chemiluminescence analyzer according to any one of Aspects A through J further includes a non-return valve (e.g., the non-return valve 124) to prevent backflow of the liquid mixture, disposed in the flow of the waste liquid caused by the first liquid conveyor (e.g., the waste liquid conveyor 113). When the chemiluminescence analyzer includes the tank, the non-return valve is disposed between the tank and the joint 123. When the chemiluminescence analyzer does not include the tank, the non-return valve is disposed to prevent the liquid mixture from entering the passage through which the waste liquid flows toward the first liquid conveyor.

As described above, since the non-return valve 124 prevents the liquid mixture discharged from the reactor from flowing to the tank 115 or the first liquid conveyor, error in the urea concentration measurement caused by the mixing of the liquid mixture can be prevented.

Aspect L

A blood purification device (e.g., the blood purification apparatus 200) includes the chemiluminescence analyzer according to any one of Aspects A through K, to measure a concentration of a target component (e.g., urea concentration) in waste liquid discharged from the blood purification apparatus in purifying blood.

This aspect enables the blood purification apparatus to achieve effects similar to those attained by the chemiluminescence analyzer according to any one of any one of Aspects A through K.

Aspect M

A blood purification system (e.g., the blood purification system 500) includes the blood purification device (e.g., the blood purification apparatus 200), and the chemiluminescence analyzer according to any one of Aspects A through K, to measure a concentration of a target component (e.g., urea concentration) in waste liquid discharged from the blood purification apparatus in purifying blood.

This aspect enables the blood purification systems to achieve effects similar to those attained by the chemiluminescence analyzer according to any one of any one of Aspects A through K.

Although aspects of this disclosure are described above with reference to the drawings, the detailed structures described above are illustrative and do not limit the present invention. This disclosure is not limited to the configurations including the chemiluminescence analyzer 100 described above, but additional modifications and variations are possible in light of the above teachings. For example, elements and/or features of different illustrative embodiments may be combined with each other and/or substituted for each other within the scope of the present invention.

What is claimed is:
1. A chemiluminescence analyzer comprising:
a reactor to cause a waste liquid discharged from a blood purification apparatus to react with a reagent solution;
a photodetector to measure an intensity of chemiluminescence arising in the reactor;
a tank to store the waste liquid from the blood purification apparatus, the tank disposed upstream from the reactor in a direction of flow of the waste liquid;
a first liquid conveyor to convey the waste liquid from the tank to the reactor;

a second liquid conveyor to convey the reagent solution to the reactor;

a liquid mixture passage extending from the reactor to convey a liquid mixture including the waste liquid and the reagent solution after reaction;

a joint to couple the liquid mixture passage to the tank;

a one-way valve disposed between the tank and the joint, the one-way valve to prevent a flow of the liquid mixture from the joint to the tank, and to allow a flow of the waste liquid from the tank to the joint; and an electric interface for connection with an external device.

2. The chemiluminescence analyzer according to claim 1, wherein the tank includes:

a first connection coupled to a waste liquid passage of the blood purification apparatus; and a second connection coupled to a passage different from the waste liquid passage.

3. The chemiluminescence analyzer according to claim 1, further comprising:

a flowmeter disposed between the reactor and the joint, the flowmeter to measure a flow rate of the liquid mixture.

4. The chemiluminescence analyzer according to claim 1, further comprising a thermometer to measure temperature of at least one of the waste liquid, the reagent solution, and the liquid mixture.

5. The chemiluminescence analyzer according to claim 1, further comprising a flowmeter to measure a flow rate of at least one of the waste liquid, the reagent solution, and the liquid mixture.

6. The chemiluminescence analyzer according to claim 1, further comprising:

an internal passage disposed inside the chemiluminescence analyzer, to convey the waste liquid; and a waste liquid connection to connect the internal passage to a portion of a waste liquid passage disposed outside and upstream from the chemiluminescence analyzer in a direction of flow of the waste liquid.

7. The chemiluminescence analyzer according to claim 1, further comprising:

an internal passage disposed inside the chemiluminescence analyzer, to convey the waste liquid; and a drain connection to connect the internal passage to a portion of the waste liquid passage disposed outside and downstream from the chemiluminescence analyzer in a direction of flow of the waste liquid.

8. The chemiluminescence analyzer according to claim 1, further comprising a reagent connection to connect the second liquid conveyor to a reagent container to contain the reagent solution, the reagent connection disposed between the second liquid conveyor and the reagent container.

9. A blood purification apparatus comprising the chemiluminescence analyzer according to claim 1, to measure a concentration of a target component in waste liquid discharged in purifying blood.

10. A blood purification system comprising:

a blood purification apparatus; and the chemiluminescence analyzer according to claim 1, to measure a concentration of a target component in the waste liquid discharged from the blood purification apparatus.

11. A chemiluminescence analyzer comprising:

a reactor to cause a waste liquid discharged from a blood purification apparatus to react with a reagent solution;

a photodetector to measure an intensity of chemiluminescence arising in the reactor;

a tank to store the waste liquid from the blood purification apparatus, the tank disposed upstream from the reactor in a direction of flow of the waste liquid;

a first liquid conveyor to convey the tank to the reactor;

a second liquid conveyor to convey the reagent solution to the reactor;

a liquid mixture passage extending from the reactor to convey a liquid mixture including the waste liquid and the reagent solution after reaction;

a joint to couple the liquid mixture passage to the tank;

a controller to control the photodetector, the first liquid conveyor, and the second liquid conveyor;

a one-way valve disposed between the tank and the joint, the on-way valve to prevent a flow of the liquid mixture from the joint to the tank, and to allow a flow of the waste liquid from the tank; and a communicator to communicate with an external device.

12. The chemiluminescence analyzer according to claim 11, further comprising:

a control panel to accept a user instruction to the chemiluminescence analyzer; and a display to display a result of measurement by the photodetector.

13. A blood purification apparatus comprising the chemiluminescence analyzer according to claim 11, to measure a concentration of a target component in the waste liquid discharged in purifying blood.

14. A blood purification system comprising:

a blood purification apparatus; and the chemiluminescence analyzer according to claim 11, to measure a concentration of a target component in the waste liquid discharged from the blood purification apparatus.

* * * * *